United States Patent [19]
Thevenot

[11] Patent Number: 6,067,853
[45] Date of Patent: May 30, 2000

[54] DEVICE FOR REDUCING THE VIBRATION IN THE CABIN OF A ROTARY-WING AIRCRAFT, ESPECIALLY A HELICOPTER

[75] Inventor: Laurent Thevenot, Velaux, France

[73] Assignee: Eurocopter, Marignane Cedex, France

[21] Appl. No.: 09/190,369

[22] Filed: Nov. 12, 1998

[30] Foreign Application Priority Data

Nov. 13, 1997 [FR] France .................................. 97 14220

[51] Int. Cl.[7] .................................................. G01C 21/00
[52] U.S. Cl. ....................................................... 73/178 H
[58] Field of Search .......................... 73/178 H; 364/508, 364/574; 188/378

[56] References Cited

U.S. PATENT DOCUMENTS

| 4,819,182 | 4/1989 | King et al. ............................... 364/508 |
| 5,456,341 | 10/1995 | Garnjost et al. ......................... 188/378 |
| 5,526,292 | 6/1996 | Hodgson et al. ........................ 364/574 |

FOREIGN PATENT DOCUMENTS

| 0 008 585 | 3/1980 | European Pat. Off. ............ F16F 7/00 |
| 2 739 670 | 4/1997 | France .............................. F16F 15/02 |
| WO 96/12121 | 4/1996 | WIPO ............................... F16F 7/10 |
| WO 97/36122 | 10/1997 | WIPO .............................. F16F 15/00 |

OTHER PUBLICATIONS

Teal, et al., "Active Vibration Suppression for the CH–47D", 53rd Annual Forum Proceedings, American Helicopter Society, vol. 3, Apr. 29–May 1, 1997, Virginia Beach, Virginia, pp. 211–219.

Morrison et al., "Comparison of Optimized Active and Passive Vibration Absorbers", 14th Joint Automatic Control Conference of the American Automatic Control Council, Jun. 20–22, 1973, New York, pp. 932–938.

French Search Report dated Jul. 15, 1998, 4 pages.

Primary Examiner—William Oen
Attorney, Agent, or Firm—Marshall, O'Toole, Gerstein, Murray & Borun

[57] ABSTRACT

The present invention relates to a device for reducing the vibration in the cabin (2) of a rotary-wing aircraft, especially a helicopter (He).

According to the invention, said device (1) comprises at least one sensor (C) arranged on the structure of the aircraft (He) and capable of measuring the values of at least one parameter that represents the vibration in said cabin (2); at least one controllable resonator (R), mounted directly in said cabin (2) and capable therein of generating a force which opposes said vibration; and a control unit (UC) capable of controlling said resonator (R) on the basis of the values measured by said sensor (C), so as to reduce and minimize said vibration.

6 Claims, 2 Drawing Sheets

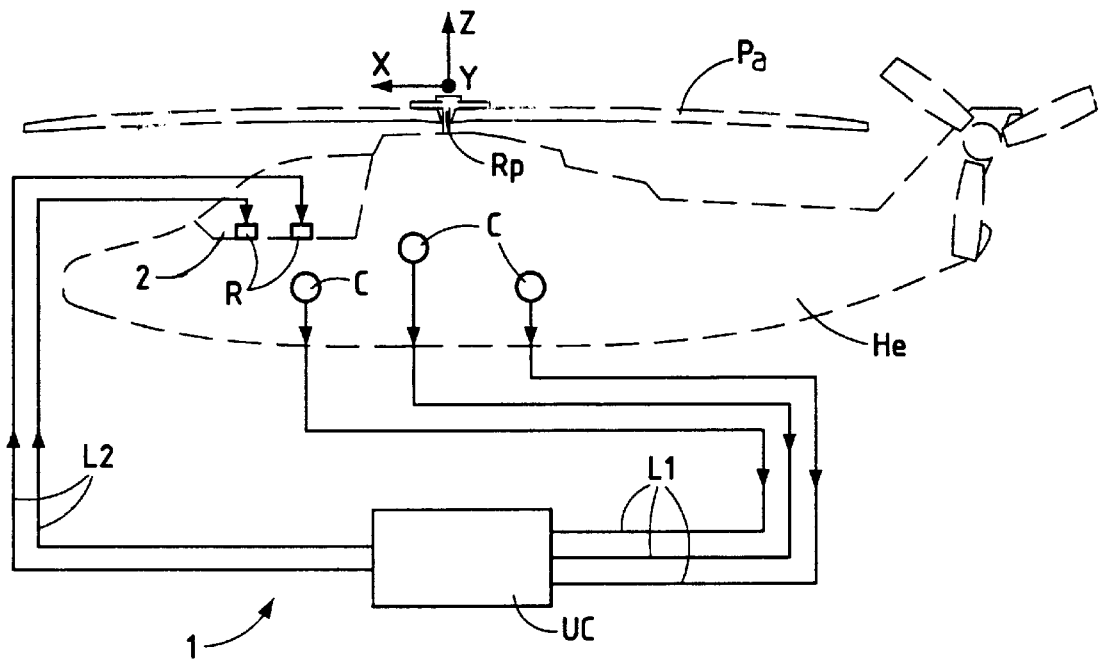
FIG.1
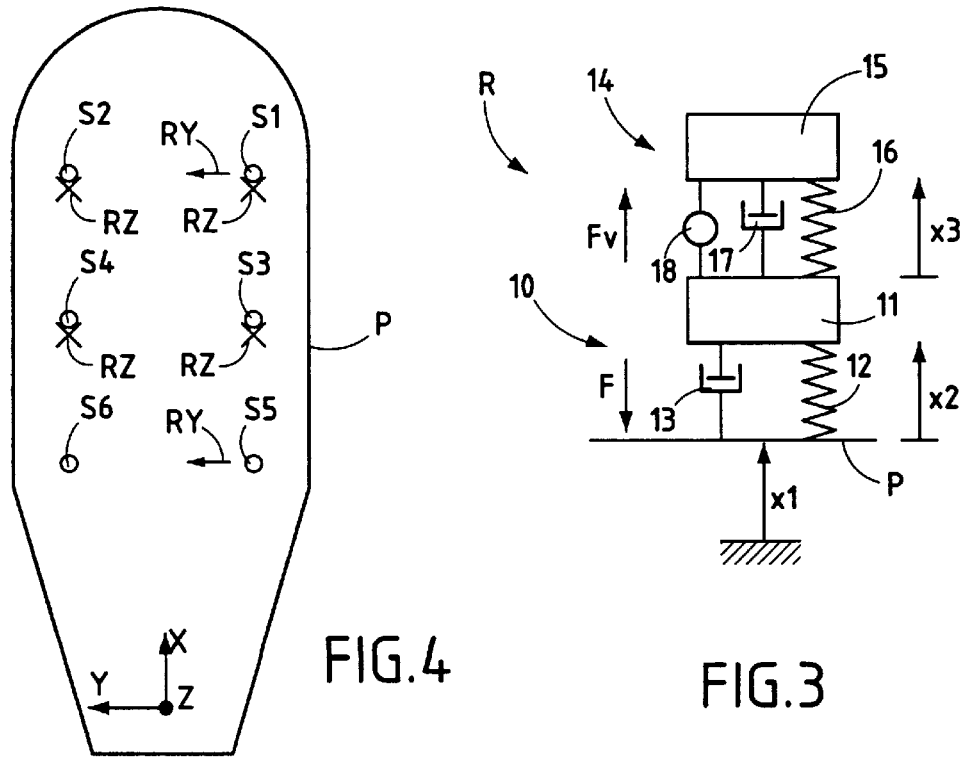
FIG.4
FIG.3

DEVICE FOR REDUCING THE VIBRATION IN THE CABIN OF A ROTARY-WING AIRCRAFT, ESPECIALLY A HELICOPTER

The present invention relates to a device for reducing the vibration in the cabin of a rotary-wing aircraft, especially a helicopter.

It is known that helicopters, simply because of the way they work, are subject to high levels of vibration.

The various vibrations there are, especially those felt in the cabin, present many drawbacks, particularly in terms of crew and passenger comfort, and in terms of the fatigue life of the components and equipment items arranged in said cabin.

It is known that one of the main causes of these vibrations is the force generated on the main lift and propulsion rotor, by the rotation of its blades.

In particular, it is known that the fuselage of a helicopter is subjected to forces and moments (generated by the main rotor) whose fundamental frequency is equal to the product of the number of blades of this rotor times the rotational frequency of the latter. The fuselage response is very sensitive to the difference between the natural frequencies of the helicopter and this product.

Furthermore, as is known, said helicopter main rotor, as it rotates, sucks in the air above it and expels it downward, accelerating it, so as to create a stream of moving air. The pressure and speed of the air vary throughout this air stream. The flow of this air over the structure of the helicopter generates vibration, particularly lateral vibration, which can be felt particularly in the cabin and is generally known as "tail shake" in aeronautical parlance.

The vibration thus generated is mainly due to the excitation, by the aforementioned aerodynamic flow, of the natural modes of the helicopter structure, and especially the first lateral bending mode of the helicopter tail. The vibration due to the excitation of this first lateral bending mode is generally at a frequency of a few hertz and is extremely troublesome.

Various antivibration devices intended to reduce said vibration, especially in the cabin, to improve pilot and passenger comfort are known.

A first known solution envisages passive antivibration devices which are generally produced in the form of resonators, which are arranged at the points whose vibration it is desired to reduce, and which act by resonating at a predetermined frequency so as to reduce the vibration which is at this frequency.

This first solution is not, however, very effective because it can act only on vibration which is at said predetermined frequency and cannot act on other vibration there may be. Furthermore, when the vibration that is to be reduced changes frequency, said antivibration device becomes ineffective and cannot be adapted to this change.

A second known solution consists in mounting antivibration devices in the form of pendulums in the region of the blades of the helicopter main rotor. This solution has the drawback of acting directly on essential parts of the helicopter and therefore risks causing serious accidents if said antivibration devices should break down or operate incorrectly.

From another source, patents U.S. Pat. No. 5,456,341 and U.S. Pat. No. 5,526,292 describe helicopter antivibration devices comprising:

at least one sensor, preferably an accelerometer, arranged on the structure of the aircraft and capable of measuring the values of at least one parameter that represents the vibration in said cabin;

at least one controllable resonator, mounted directly in said cabin and capable of generating therein a force which opposes said vibration; and a control unit capable of controlling said resonator on the basis of the values measured by said sensor, so as to reduce and minimize said vibration.

The object of the present invention is to improve these known antivibration devices.

To this end, the control unit of the device according to the invention performs the following operations in turn:

it determines, from the values measured by said sensor, a level of vibration that represents said vibration in the cabin;

it estimates the force which needs to be generated by said resonator to reduce and minimize said level of vibration to an estimated minimum level of vibration;

it controls said resonator to make it generate said estimated force; and then it iteratively performs the following operations in turn:

it determines the actual level of vibration resulting from the last control applied to said resonator, from the corresponding values measured by said sensor;

it calculates the difference between said actual level of vibration and the last estimated minimum level of vibration;

it estimates, from said difference, a new force which needs to be generated by said resonator to reduce and minimize said level of vibration to a new estimated minimum level of vibration; and it controls said resonator to make it generate said new force.

As a preference, when the device in accordance with the invention comprises a number of sensors for estimating said force that will allow said level of vibration to be minimized, said control unit minimizes the sum of the squares of the values measured by said sensors.

Furthermore, advantageously, said resonator comprises a first resonator means which has a predetermined resonating frequency and a second resonator means whose frequency can be adjusted, which is associated with said first resonator means.

In this case, advantageously, said second resonator means comprises a mass connected by a spring to said first resonator means, and a controllable electrodynamic actuator arranged in parallel with said spring and capable of altering the frequency of said resonator, when it is controlled, which allows the antivibration action of the device in accordance with the invention to be adapted easily to any possible variations in the frequency of the vibration that is to be reduced.

In addition, as said resonator is preferably excited at a predefined resonating frequency, rather close to the frequency of the vibration that is to be attenuated, the action of said second resonator means is limited to adapting said resonating frequency to any variations in the frequency of said vibration so that the forces to be controlled are therefore minimal and the power consumption needed is low.

Furthermore, in a particularly advantageous embodiment of the invention, applied to a rotary-wing aircraft comprising a cabin which is equipped, at least on the right-hand side of the longitudinal axis of the aircraft, with seats for a pilot, a right-hand front passenger and a right-hand rear passenger, and, at least on the left-hand side of the longitudinal axis of the aircraft, with seats for a copilot, a left-hand front passenger and a left-hand rear passenger, advantageously said device comprises, on the one hand, resonators acting only along a lateral axis which is orthogonal to the vertical axis of the lift rotor of the aircraft and to the longitudinal axis of the aircraft in the region of the pilot's and right-hand rear passenger's seats respectively, and, on the other hand, resonators acting only along the vertical axis of said rotor in the region of the pilot's, the co-pilot's and the right-hand and left-hand front passengers' seats respectively.

More generally, in the context of the present invention, the resonators are optimized, particularly as far as their positions, their orientations, their dimensions and their number are concerned, to suit the type of aircraft, its missions, the equipment with which it is fitted, etc.

The figures of the appended drawing will make it easy to understand how the invention may be achieved. In these figures, identical references denote similar elements.

FIG. 1 diagrammatically illustrates a device in accordance with the invention applied to a helicopter.

FIG. 3 shows diagrammatically a resonator of a device in accordance with the invention.

FIG. 4 shows diagrammatically the location of a number of resonators of a device in accordance with the invention on a helicopter.

Figure 2:
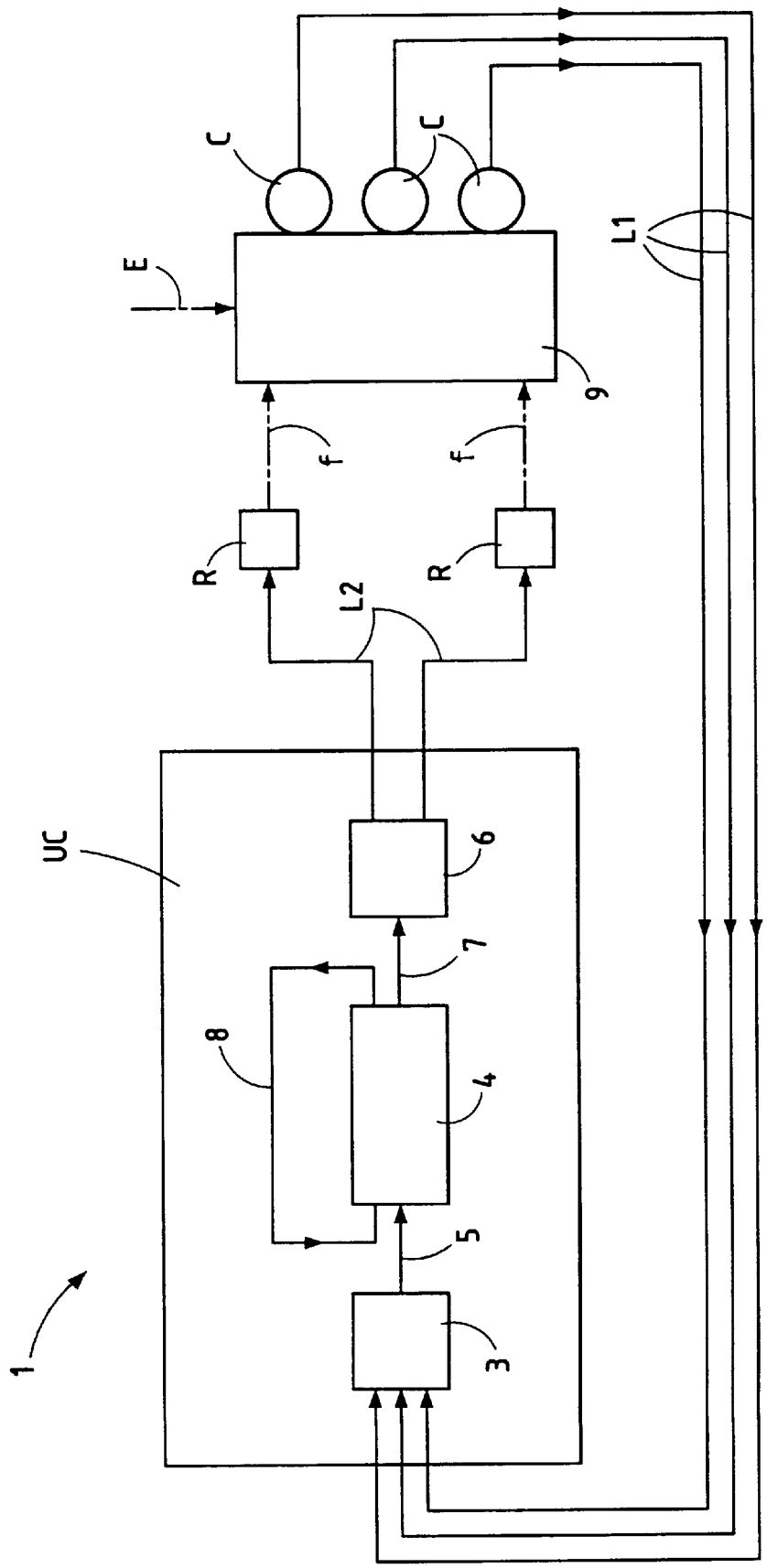
FIG. 2 shows the block diagram of a control unit for controlling a device in accordance with the invention, and the action of said control unit.

The device 1 in accordance with the invention and depicted diagrammatically in FIG. 1 is applied to a rotary-wing aircraft, in this case a helicopter He shown in broken line, and is intended to reduce vibration generated in the cabin 2 of said helicopter He and which is troublesome, particularly to the pilots and passengers.

For this purpose, said device 1 comprises, according to the invention:

a number of sensors C, preferably accelerometers, arranged at various points on the structure of the helicopter He and capable of measuring the values of at least one parameter, particularly an acceleration, that represents the vibration in said cabin 2 which is to be attenuated;

a number of controllable resonators R specified hereinbelow, which are mounted directly in the cabin 2 and are capable of generating therein forces which oppose said vibration so as to attenuate it; and a control unit UC connected by links L1 and L2 respectively to said sensors C and to said resonators R. According to the invention, said control unit UC is intended to control said resonators R on the basis of the values measured by said sensors C, so as to reduce and minimize the vibration in the cabin 2 of the helicopter He, as specified hereinbelow.

As can be seen in FIG. 2, said control unit UC comprises:

an analysis unit 3 which allows the sinusoidal components of said vibration to be determined from the measured values received from said sensors C;

a calculation unit 4 connected by a link 5 to the analysis unit 3 and capable, as specified hereinbelow, of determining the control commands for the resonators R on the basis of the values received from said analysis unit 3; and a filtering unit 6 connected by a link 7 to said calculation unit 4, filtering the control commands produced by the latter before transmitting them to the resonators R. Said filtering is intended to keep the control commands within a control range capable of being executed by said resonators R and/or to limit the forces generated by the resonators R to predefined values.

More specifically, according to the invention, said calculation unit 4 performs the following operations in turn:

it determines, from the values measured by said sensors C and processed by said analysis unit 3, a level of vibration that represents said vibration in the cabin 2;

it estimates the forces which need to be generated by said resonators R to reduce and minimize said level of vibration to an estimated minimum level of vibration;

it controls said resonators R to make them generate said estimated forces; and then it iteratively performs the following operations in turn:

it determines the actual level of vibration resulting from the last controls applied to said resonators R, from the corresponding values measured by said sensors C;

it calculates the difference between said actual level of vibration and the last estimated minimum level of vibration received by a link 8; and it estimates, from said difference, new forces which need to be generated by said resonators R to reduce and minimize said level of vibration to a new estimated minimum level of vibration; and it controls said resonators R to make them generate said new forces.

In addition, to estimate the optimum forces to be controlled, said calculation unit 4 according to the invention minimizes the sum, preferably the weighted sum, of the squares of the measured values received. The weighting of the squares of said values is intended to differentiate between the significance of the vibration reduction, depending on the measurement points considered.

Of course, the aforementioned method is not the only possible method. Indeed, in the context of the present invention, any method employing a criterion of minimizing, whatever this might be, may be used.

As can be seen in FIG. 2, during this iterative control process, the structure 9 (illustrated diagrammatically) of the helicopter He is subjected:

on the one hand, to vibrational effects generated by vibration sources, said effects being illustrated overall by an arrow E in chain line. As is known, one of the main sources of vibration in the helicopter He is the main lift and propulsion rotor Rp which is depicted diagrammatically in FIG. 1 and which, on account of its rotation, creates vibration at a frequency $b\Omega$, b being the number of blades Pa of said rotor Rp and $\Omega$ being its rotational frequency; and on the other hand, to the forces generated by said resonators R controlled by the control unit UC, as illustrated by arrows f in chain line.

In a preferred embodiment, each of said resonators R comprises, as depicted in FIG. 3 which shows the displacement x1 due to vibration of the floor P of the cabin 2 of the helicopter He:

a first resonator means 10 comprising a body 11 of mass M2 which is connected, via a spring 12 of stiffness k2 and a damping means 13 of value c2, to said floor P with respect to which it can travel a distance x2 under a force F; and a second resonator means 14 which comprises:

a body 15 of mass M1 connected, via a spring 16 of stiffness k1 and a damping means 17 of value c1, to the body 11 with respect to which it can travel a distance x3; and an electrodynamic actuator 18 capable of being controlled by the control unit UC so as to supply an adjustable force Fv, which allows the frequency of said resonator R to be adjusted.

By way of example, said resonator R may have the following values:

M1=12 kg

M2=7.2 kg k1=47170 N/m k2=232130 N/m $c1=0.015 \times 2 \times \sqrt{M1 \cdot k1} = 22.57$ kg/s $c2=0.015 \times 2 \times \sqrt{M2 \cdot k2} = 38.78$ kg/s, so as to obtain damping of 1.5% for c1 and c2.

Furthermore, a particularly advantageous embodiment of the invention, and one which is depicted partially and diagrammatically in FIG. 4, is applied to a helicopter He, the cabin 2 of which has seats for a pilot, a copilot, a right-hand (with respect to the longitudinal axis X of the helicopter He) front passenger, a left-hand front passenger, a right-hand rear passenger and a left-hand rear passenger, illustrated by circles S1 to S6 respectively. Of course, this example is nonlimiting.

In this instance, the device 1 in accordance with the invention preferably comprises:

on the one hand, resonators R acting along a lateral axis Y, as illustrated by the arrows RY, and arranged respectively in the region of the seats S1 and S5; and on the other hand, resonators R acting along a vertical axis Z, as illustrated by crosses RZ (the reference frame XYZ also being depicted in FIG. 1 with a view to providing a better understanding) and arranged respectively in the region of the seats S1, S2, S3 and S4.

To select the optimum positions for said resonators R, a single resonator is arranged in turn in all or a number of the conceivable positions, and the reductions in vibration obtained for each of its positions are evaluated and compared with each other.

Incidentally, it will be noted that in the context of the present invention, said sensors C may also be produced in such a way as to measure parameters other than the acceleration, such as a speed, a force, a displacement or a strain.

Thus, by virtue of the invention, and in particular by virtue of the aforementioned characteristics of the resonators R, the following advantages in particular are obtained:

good adaptability to changes in vibrational frequency;

low power consumption, because each resonator R is preferably pre-set to the frequency of the vibration to be reduced, for example the aforementioned frequency bΩ and the electrodynamic actuator 18, which consumes power, is operated only to adapt the frequency of said resonator R to possible variations in the frequency of said vibration;

adjustment which is easier than with a conventional resonator of the passive type which, as is known, requires fine tuning at the time of fitting;

the entire device 1 is simple to fit and requires no modifications to the components or parts of the helicopter He which means that it can be fitted to any type of helicopter;

no safety risk because the resonators R are not mounted on parts of the helicopter which are essential and are liable to be disturbed;

low cost, because of the nature and number of elements UC, C and R used; and high degree of efficiency.

I claim:

1. A device for reducing the vibration in the cabin (2) of a rotary-wing aircraft, especially a helicopter (He), said device comprising:

at least one sensor (C) arranged on the structure of the aircraft (He) and capable of measuring the values of at least one parameter that represents the vibration in said cabin (2);

at least one controllable resonator (R), mounted directly in said cabin (2) and capable therein of generating a force which opposes said vibration; and a control unit (UC) capable of controlling said resonator (R) on the basis of the values measured by said sensor (C), so as to reduce and minimize said vibration, wherein said control unit (UC) performs the following operations in turn:

it determines, from the values measured by said sensor (C), a level of vibration that represents said vibration in the cabin (2);

it estimates the force which needs to be generated by said resonator (R) to reduce and minimize said level of vibration to an estimated minimum level of vibration;

it controls said resonator (R) to make it generate said estimated force; and then it iteratively performs the following operations in turn:

it determines the actual level of vibration resulting from the last control applied to said resonator (R), from the corresponding values measured by said sensor (C);

it calculates the difference between said actual level of vibration and the last estimated minimum level of vibration;

it estimates, from said difference, a new force which needs to be generated by said resonator (R) to reduce and minimize said level of vibration to a new estimated minimum level of vibration; and it controls said resonator (R) to make it generate said new force.

2. The device as claimed in claim 1, comprising a number of sensors (C), wherein, to estimate said force that will allow said level of vibration to be minimized, said control unit (UC) minimizes the sum of the squares of the values measured by said sensors (C).

3. The device as claimed in claim 1, wherein said sensor (C) is an accelerometer.

4. The device as claimed in claim 1, wherein said resonator (R) comprises a first resonator means (10) which has a predetermined resonating frequency and a second resonator means (14) whose frequency can be adjusted, which is associated with said first resonator means (10).

5. The device as claimed in claim 4, wherein said second resonator means (14) comprises a mass (15) connected by a spring (16) to said first resonator means (10), and a controllable electrodynamic actuator (18) arranged in parallel with said spring (16) and capable of altering the frequency of said resonator (R), when it is controlled.

6. The device as claimed in claim 1, for a rotary-wing aircraft (He) comprising a cabin (2) which is equipped, at least on the right-hand side of the longitudinal axis (X) of the aircraft (He), with seats (S1, S3, S5) for a pilot, a right-hand front passenger and a right-hand rear passenger, and, at least on the left-hand side of the longitudinal axis (X) of the aircraft (He), with seats (S2, S4, S6) for a copilot, a left-hand front passenger and a left-hand rear passenger, which device comprises resonators (R) acting only along a lateral axis (Y) which is orthogonal to the vertical axis (Z) of the lift rotor (Rp) of the aircraft (He) and to the longitudinal axis (X) of the aircraft (He) in the region of the pilot's and right-hand rear passenger's seats (S1, S5) respectively, and resonators (R) acting only along the vertical axis (Z) of said rotor (Rp) in the region of the pilot's, the co-pilot's and the right-hand and left-hand front passengers' seats (S1, S2, S3, S4) respectively.

* * * * *